United States Patent
Hu et al.

(10) Patent No.: US 11,947,172 B2
(45) Date of Patent: Apr. 2, 2024

(54) OPTICAL PROBE PACKAGE STRUCTURE

(71) Applicant: FOCI FIBER OPTIC COMMUNICATIONS, INC., Hsinchu (TW)

(72) Inventors: Ting-Ta Hu, Hsinchu (TW); Hsu-Liang Hsiao, Hsinchu (TW); Po-Yi Wu, Hsinchu (TW)

(73) Assignee: FOCI FIBER OPTIC COMMUNICATIONS, INC., Hsinchu (TW)

( * ) Notice: Subject to any disclaimer, the term of this patent is extended or adjusted under 35 U.S.C. 154(b) by 98 days.

(21) Appl. No.: 17/862,442

(22) Filed: Jul. 12, 2022

(65) Prior Publication Data
US 2023/0358976 A1   Nov. 9, 2023

(30) Foreign Application Priority Data
May 5, 2022  (TW) .................................. 111117016

(51) Int. Cl.
*G02B 6/42* (2006.01)
*G01M 11/00* (2006.01)

(52) U.S. Cl.
CPC ........... *G02B 6/4214* (2013.01); *G01M 11/30* (2013.01); *G02B 6/4207* (2013.01); *G02B 6/423* (2013.01)

(58) Field of Classification Search
CPC ...... G01M 11/35; G01M 11/37; G01M 11/30; G02B 6/305; G02B 6/4214; G02B 6/30; G02B 6/4249
See application file for complete search history.

(56) References Cited

U.S. PATENT DOCUMENTS 8,538,213 B2 * 9/2013 Uchida .................. G02B 6/305
385/14

FOREIGN PATENT DOCUMENTS

CN          113568102 A  * 10/2021

* cited by examiner

*Primary Examiner* — Omar R Rojas
(74) *Attorney, Agent, or Firm* — Lin & Associates IP, Inc.

(57) ABSTRACT

An optical probe package structure is provided, used in a test environment for testing a plurality of optical chips on a wafer, including: a main body, an optical fiber, an optical fiber positioning area, a mode field conversion waveguide structure, and an optical waveguide. Wherein, the mode field conversion waveguide structure is used to convert the propagation field of the optical signal, and the optical signal transmitted by the mode field conversion waveguide structure enters the optical waveguide. The optical waveguide has an emitting end, and the emitting end is provided with a facet, the facet has a facet angle, and the facet angle makes the optical signal after field conversion mode field conversion to produce total reflection and output along a second direction. The optical signal after total reflection enters the optical chips. Thereby, an optical probe package structure that can test before wafer cutting and polishing is provided.

9 Claims, 8 Drawing Sheets

OPTICAL PROBE PACKAGE STRUCTURE

BACKGROUND OF THE INVENTION

1. Field of the Invention

The present invention relates generally to an optical probe package structure, and more particularly, to an optical probe package structure applicable to an uncut wafer and integrally formed with a plurality of optical chips.

2. The Prior Arts

Flat optical elements, or planar optical elements, are optical elements based on optical waveguide technology, which are fabricated on various types of flat substrates. Optical wafers based on the optical waveguide technology can contain three types of components, including passive, active, and electronic components, wherein the passive components include single components such as optical waveguides, directional couplers, Mach-Zehnder interferometers, ring resonators, or a photonic integrated circuit composed of various components and functions. These optical wafers are fabricated on flat substrates. Typically, individual wafers are batch fabricated on semiconductor wafers made of, for example, Si or InP. These wafers go through various fabrication steps, such as material deposition and etching, often involving photolithography, to form discrete optical components in or on top of the substrate material.

In the prior art, inspection of flat optical components at the wafer level is typically accomplished by surface coupling light, which couples light into the wafer for standard on-wafer optical signal testing using electrical connections to the wafer. However, in order to achieve surface coupling, the flat optical element must make a grating structure on the coupling surface, and use a fiber array connector to align the light coupling. However, it is difficult to improve the coupling efficiency of the grating structure, therefore, it is difficult to achieve any breakthrough in the aforementioned technologies. And in terms of the accuracy of the alignment angle, the optical fiber of the grating coupling method must not only maintain a certain distance from the grating in the horizontal direction, but also ensure a certain height in the vertical direction, which requires a special structure to ensure the vertical coupling. accuracy, resulting in a substantial increase in cost and size of the test element.

In the prior art, another detection method is to use a wafer foundry to produce end-coupled optical components, so as to detect through the optical fiber after the wafer is cut and polished. However, this detection method is costly and time-consuming. In addition, it is also impossible to analyze the device process yield and improve the process at the first time, therefore, it is easy to generate additional manufacturing costs and increase the product development cycle. Moreover, if manual coupling is used in the testing of wafer-level flat optical components, the structures that can be tested will be greatly limited, and the testing efficiency will also be low. If wafers are to be mass-produced, a high-speed, efficient, and reliable inspection scheme must be implemented.

In view of the above-mentioned shortcomings, the present invention is provided to address these issues.

SUMMARY OF THE INVENTION

A primary objective of the present invention is to provide an optical probe package structure, which is used in a test environment where an uncut wafer is integrally formed with an optical chip, wherein the bottom of the optical probe package structure is provided with facets, the thickness of the optical probe package structure is between 0.4 mm and 0.8 mm, and the facet has a facet angle to generate total reflection of the optical signal transmitted by the optical fiber. The surface couples the optical signal after the mode field conversion to the optical chip on the wafer. As such, an optical probe package structure that can penetrate into the optical chip for testing before wafer cutting and polishing, so as to analyze the component process yield and improve the process at the earliest, and reduce the extra production cost and product development cycle. At the same time, the present invention improves the detection accuracy and convenience of end-face coupling light, and has both wide applicability and high accuracy.

Another objective of the present invention is to provide an optical probe package structure, wherein the material of the optical probe package structure is consistent with the material of the optical chip, and through the mode field conversion waveguide structure converting the mode field diameter (MFD), the present invention makes the propagation field of the optical signal match the propagation field of the optical chip, and greatly improves the coupling efficiency of the optical probe package structure and the optical chip. Moreover, since the number of channels of the optical waveguide is not limited, it is suitable for mass production, thereby solving all the problems of the above-mentioned conventional technologies.

Yet another objective of the present invention is to provide an optical probe package structure, wherein, the optical probe package structure is provided with an optical fiber positioning area, and the optical fiber positioning area includes a plurality of V-shaped grooves, and each V-shaped groove can only accommodate at most a single optical fiber, and through the optical probe package structure to ensure the angle and position of the optical fiber to the optical chip on the wafer, so as to ensure the accuracy of vertical coupling, thereby improving the alignment accuracy and detection efficiency, and reducing tolerance and calibration time.

In order to achieve the above objectives and effects, the present invention provides an optical probe package structure, which is used in a test environment for testing a plurality of optical chips on a wafer. The optical probe package includes: a main body; a plurality of optical fibers, coupled to the main body, the optical fibers being arranged on a substrate, and the optical fibers being used to transmit an optical signal along a first direction; an optical fiber positioning area, disposed on the main body, and the optical fibers positioning area having a plurality of V-grooves, each of the V-grooves accommodating one of the optical fibers, and the optical fibers being positioned by the V-grooves; a mode field conversion waveguide structure, disposed on the main body and coupled to the optical fibers, the mode field conversion waveguide structure being used for receiving the optical signal in the optical fibers and converting a mode field diameter of the optical signal, and the mode field conversion waveguide structure having an incident end, from which the optical signal transmitted by the optical fiber entering the mode field conversion waveguide structure; an optical waveguide, disposed on the main body and coupled to the mode field conversion waveguide structure, the optical waveguide having an emission end, and the emitting end having a facet, and the facet having a facet angle; wherein, the facet angle causing the optical signal after mode field conversion to generate total reflection, and output from the emitting end of the optical waveguide along a second direction, and the optical signal after total reflection entering the optical chips.

Preferably, according to the optical probe package structure of the present invention, the facet angle is between 37 degrees and 45 degrees.

Preferably, according to the optical probe package structure of the present invention, the mode field diameter before the optical signal conversion is between 3 um and 10 um, and the mode field diameter after the optical signal conversion is between 0.2 um and 0.9 um between um.

Preferably, according to the optical probe package structure of the present invention, the material of the optical probe package structure includes silicon material.

Preferably, according to the optical probe package structure of the present invention, the optical fibers include a film layer and a core portion, the film layer covers the core portion, and the optical signal is transmitted in the core portion.

Preferably, according to the optical probe package structure of the present invention, the material of the optical probe package structure is the same as the material of the optical chip.

Preferably, according to the optical probe package structure of the present invention, it further comprises a plurality of microlenses, disposed on the emitting end of the mode field conversion waveguide structure, and the microlenses focusing total reflection of the optical signal from the facet, so that the optical signal after total reflection being focused into the optical chips through the microlenses.

Preferably, according to the optical probe package structure of the present invention, the optical wafers have a dicing lane, and the dicing lane is used for inserting the optical probe package structure, so that the optical probe package structure is coupled to the optical chips on the wafer.

Preferably, according to the optical probe package structure of the present invention, it further includes a positioning block, disposed at the front end of the main body, and having a shape corresponding to the dicing lane.

In summary, the optical probe package structure of the present invention has a facet at the bottom of the mode field conversion waveguide structure, the thickness of the optical probe package structure is between 0.4 mm and 0.8 mm, and the facet has a facet angle causing total reflection of the optical signal transmitted by the optical fiber. The optical signal after total reflection enters the optical waveguide of the optical chip through the microlens, and the optical signal after the mode field conversion is coupled to the optical chip on the wafer through the facet. As such, an optical probe package structure that can penetrate into the optical chip for testing before wafer cutting and polishing is provided, so as to analyze the component process yield and improve the process at the earliest time, and reduce the extra production cost and product development cycle. Also, the present invention improves the detection accuracy and convenience of end-face coupling light, and has both wide applicability and high accuracy. Moreover, since the material of the optical probe package structure is the same as the material of the optical chip, and the optical waveguide and the mode field conversion waveguide structure convert the propagation field pattern of the optical signal to match the field pattern of the optical chip, thereby improving the optical probe package structure and optical properties in addition to the coupling efficiency of the wafer, since the number of channels of the optical waveguide is not limited, it is suitable for mass production.

To make those skilled in the art understand the purpose, features and effects of the present invention, the present invention is described in detail as follows by means of the following specific embodiments and in conjunction with the accompanying drawings.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
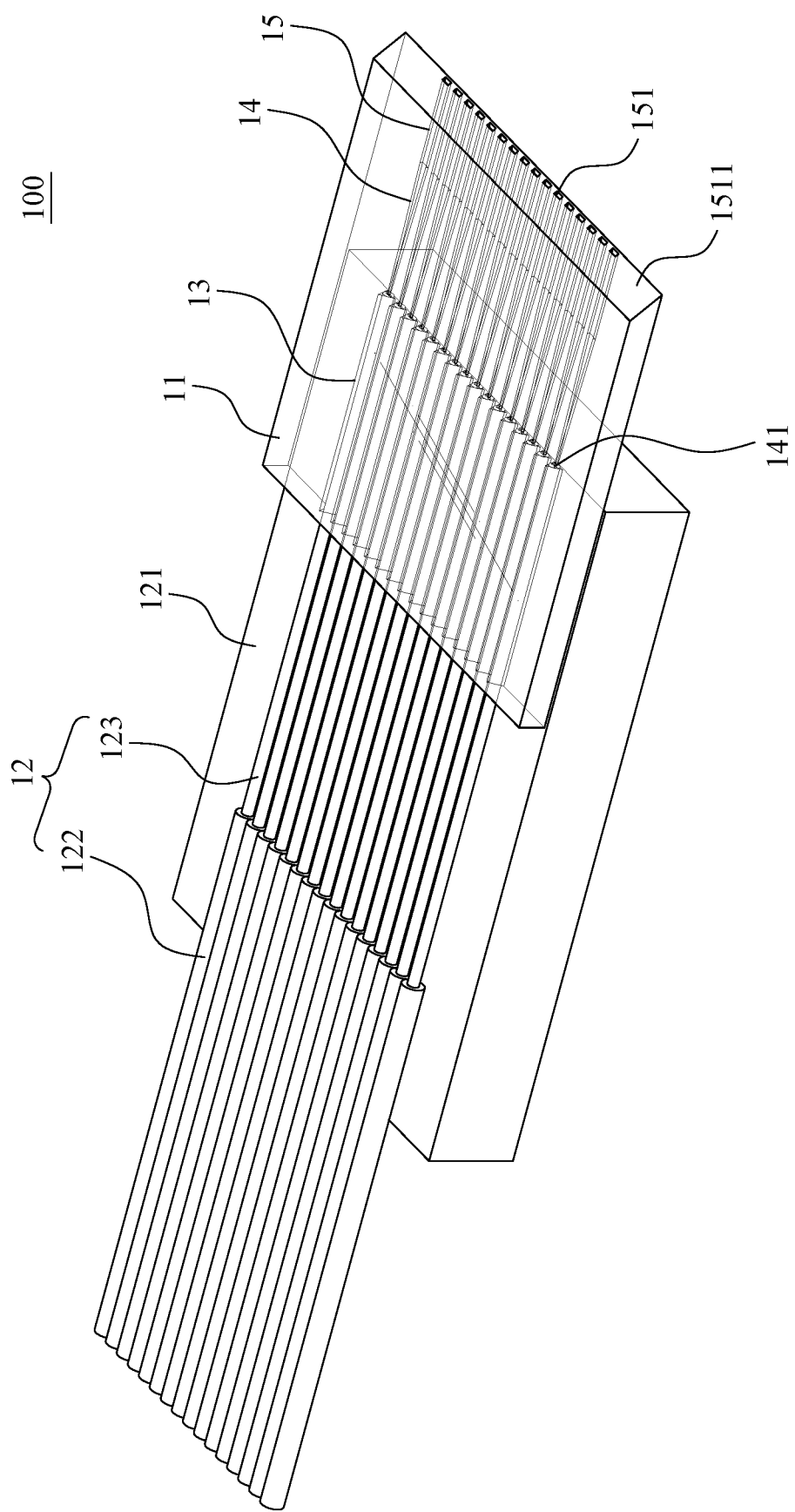
FIG. 1 is a schematic view of an optical probe package structure according to a first embodiment of the present invention.

The inventive concept will be explained more fully hereinafter with reference to the accompanying drawings in which exemplary embodiments of the inventive concept are shown. Advantages and features of the inventive concept and methods for achieving the same will be apparent from the following exemplary embodiments, which are set forth in more details with reference to the accompanying drawings. However, it should be noted that the present inventive concept is not limited to the following exemplary embodiments, but may be implemented in various forms. Accordingly, the exemplary embodiments are provided merely to disclose the inventive concept and to familiarize those skilled in the art with the type of the inventive concept. In the drawings, exemplary embodiments of the inventive concepts are not limited to the specific examples provided herein and are exaggerated for clarity.

The terminology used herein is used to describe particular embodiments only, and is not intended to limit the present invention. As used herein, the singular terms "a" and "the" are intended to include the plural forms as well, unless the context clearly dictates otherwise. As used herein, the term "and/or" includes any and all combinations of one or more of the associated listed items. It will be understood that when an element is referred to as being "connected" or "coupled" to another element, it can be directly connected or coupled to the other element or intervening elements may be present.

Similarly, it will be understood that when an element (e.g., a layer, region, or substrate) is referred to as being "on" another element, it can be directly on the other element or intervening elements may be present. In contrast, the term "directly" means that no intervening elements are present. It should be further understood that when the terms "comprising" and "including" are used herein, it is intended to indicate the presence of stated features, steps, operations, elements, and/or components, but does not exclude one or more other features, steps, operations, elements, components, and/or the presence or addition of groups thereof.

Furthermore, exemplary embodiments in the detailed description are set forth in cross-section illustrations that are idealized exemplary illustrations of the present inventive concepts. Accordingly, the shapes of the exemplary figures may be modified according to manufacturing techniques and/or tolerable errors. Therefore, the exemplary embodiments of the present inventive concept are not limited to the specific shapes shown in the exemplary figures, but may include other shapes that may be produced according to the manufacturing process. The regions illustrated in the figures have general characteristics and are used to illustrate specific shapes of elements. Therefore, this should not be considered limited to the scope of this creative concept.

It will also be understood that, although the terms "first," "second," "third," etc. may be used herein to describe various elements, these elements should not be limited by these terms. These terms are only used to distinguish each element. Thus, a first element in some embodiments could be termed a second element in other embodiments without departing from the teachings of the present creation. Exemplary embodiments of aspects of the present inventive concept illustrated and described herein include their complementary counterparts. Throughout this specification, the same reference numbers or the same designators refer to the same elements.

Furthermore, example embodiments are described herein with reference to cross-sectional and/or planar views, which are illustrations of idealized example illustrations. Accordingly, deviations from the shapes shown, for example, caused by manufacturing techniques and/or tolerances, are expected. Accordingly, the exemplary embodiments should not be considered limited to the shapes of the regions shown herein, but are intended to include deviations in shapes resulting from, for example, manufacturing. Thus, the regions illustrated in the figures are schematic and their shapes are not intended to illustrate the actual shape of a region of a device and are not intended to limit the scope of example embodiments.

Figure 2:
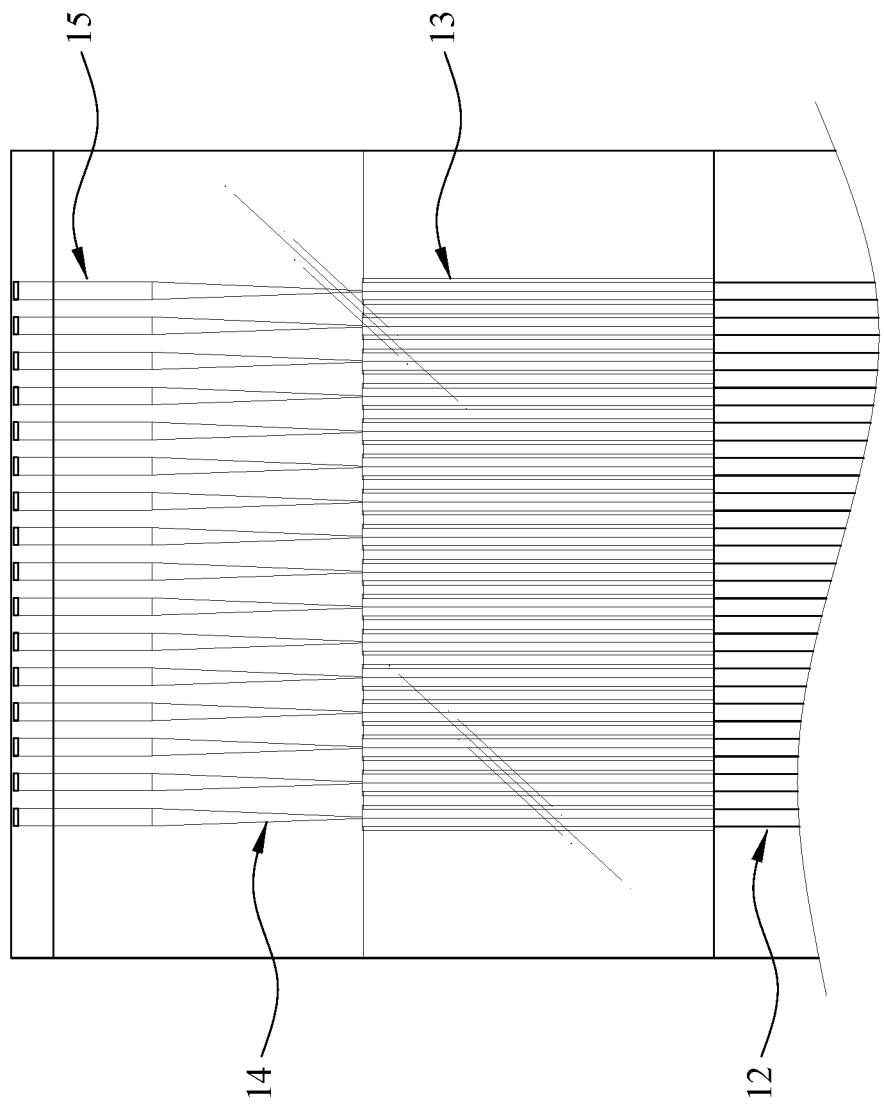
FIG. 2 is a schematic view of a main body according to the first embodiment of the present invention.
Figure 3:
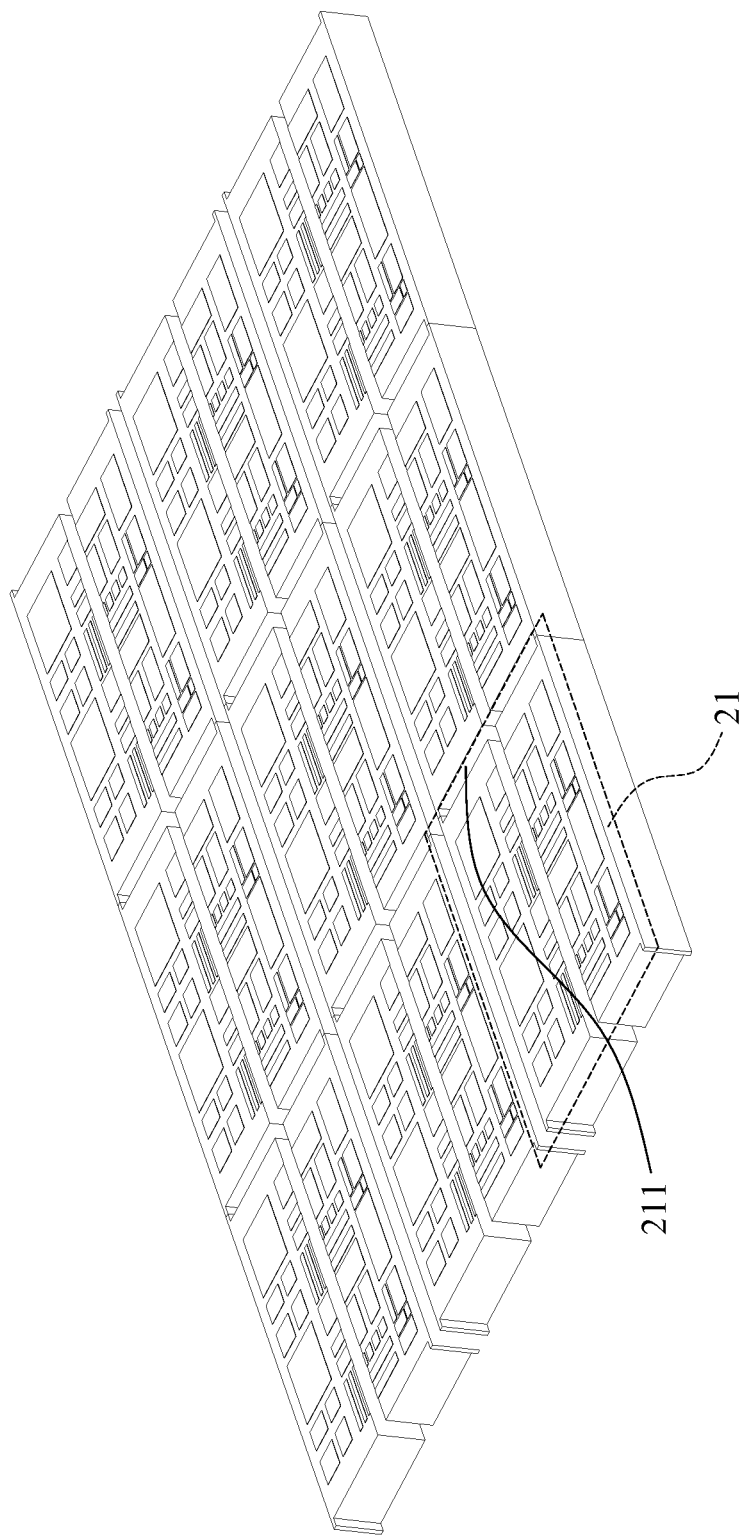
FIG. 3 is a schematic view of a wafer according to the first embodiment of the present invention.
Figure 4:
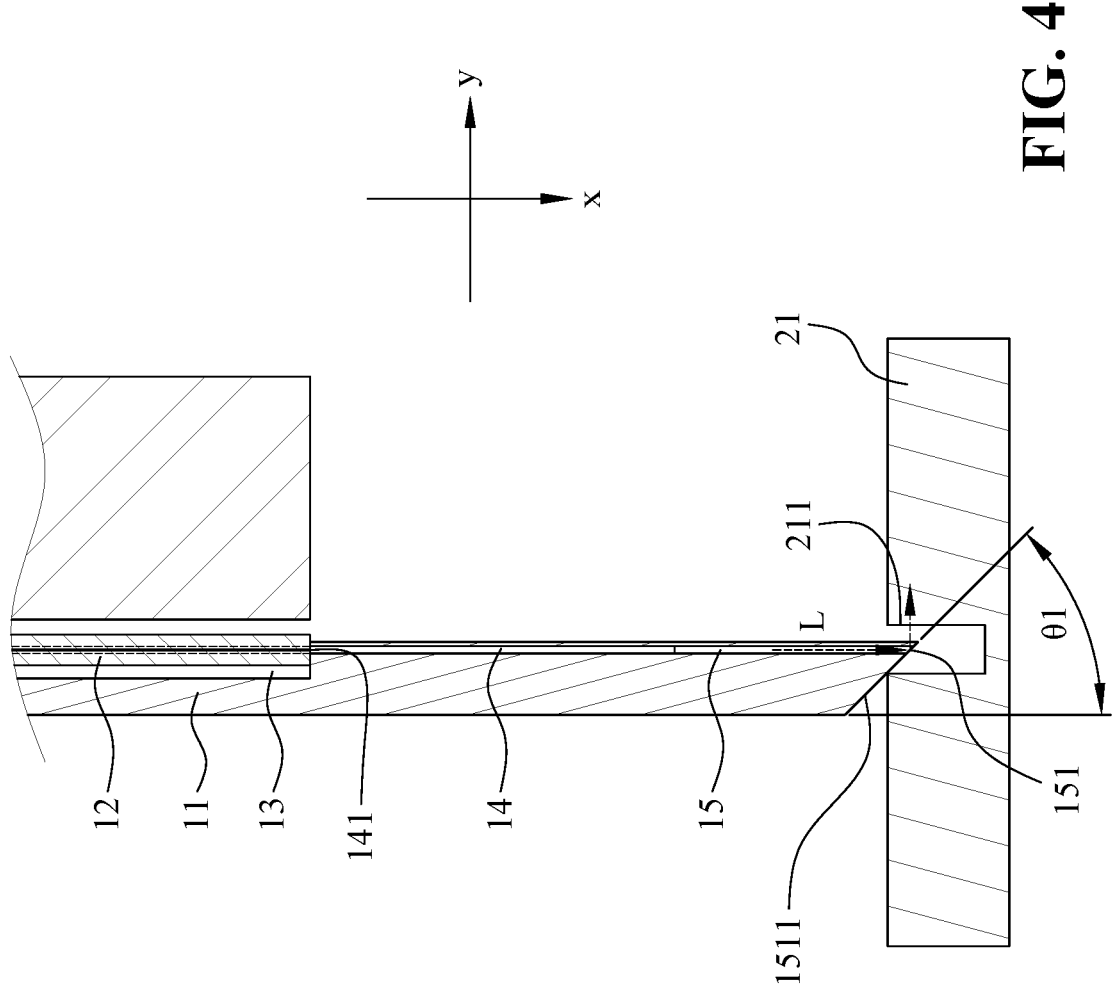
FIG. 4 is a schematic view illustrating the end-face coupling of the optical probe package structure and the optical chip according to the first embodiment of the present invention.

Refer to FIGS. 1-4. FIG. 1 is a schematic view of the optical probe package structure according to the first embodiment of the present invention; FIG. 2 is a schematic view of the main body according to the first embodiment of the present invention; FIG. 3 is a schematic view of the wafer of the first embodiment of the present invention; FIG. 4 is a schematic view illustrating the end-face coupling of the optical probe package structure and the optical chip according to the first embodiment of the present invention. As shown in FIG. 1, the optical probe package structure 100 of the first embodiment of the present invention is applied in a test environment having a plurality of optical chips 21 on a test wafer 200. The optical probe package structure 100 includes: a main body 11, a optical fiber 12, a fiber positioning area 13, an optical waveguide 15, and a mode field conversion waveguide structure 14.

Specifically, as shown in FIG. 3, the test wafer 200 of the first embodiment of the present invention may have a plurality of optical chips 21, and the optical chips 21 may have dicing lanes 211, wherein the dicing lanes 211 are used for inserting the optical probe package structure 100 into the dicing lanes 211, so that the optical probe package structure 100 is coupled to the optical chips 21 on the wafer 200. In the present embodiment, the dicing lane 211 can be formed by etching or physical removal, for example, a shallow groove that does not penetrate the bottom of the wafer 200. More specifically, the depth of the dicing lane 211 can be only greater than the length of the mode field conversion waveguide structure 14; however, the present invention is not limited thereto.

Specifically, referring to FIGS. 1-2, the optical probe package structure 100 of the first embodiment of the present invention has a main body 11, the main body 11 is coupled to the optical fiber 12, and the main body 11 has an optical fiber positioning area 13, an optical waveguide 15 and a mode field conversion waveguide structure 14. More specifically, in the present embodiment, the material of the main body 11 of the optical probe package structure 100 may include silicon material because the transmission wavelength of the optical signal used in optical communication is generally 1310 nm and 1550 nm. Neither of these two wavelengths is absorbed by the silicon material, so that the optical signals in the above-mentioned wavelength bands can pass through unimpeded, and the optical loss is reduced.

Specifically, refer to FIG. 1. According to the first embodiment of the present invention, the optical fiber 12 is coupled to the main body 11, the optical fiber 12 is disposed on a substrate 121, and the optical fiber 12 is used for transmitting the optical signal L along the first direction x. It should be further noted that, in the present embodiment, the optical fiber 12 may include a film layer 122 and a core portion 123, wherein the film layer 122 covers the core portion 123, and one end of the core portion 123 forms a lead angle θ2 (not shown) with the first direction x, and the optical signal L is transmitted in the core portion 123. Specifically, the lead angle θ2 may be less than 10 degrees; more specifically, the lead angle θ2 may be between 2 degrees and 10 degrees. It should be further explained that the lead angle θ2 is mainly used to make the optical coupling distance between the core portion 123 and the optical chip closer, and the optical loss of the optical signal L can be reduced as well as to prevent reflection during testing the optical chip 21, thereby further achieving the purpose of reducing light loss.

It is worth mentioning that, in the present embodiment, the material of the main body 11 of the optical probe package structure 100 can be the same as the material of the optical chip 21, thereby improving the coupling efficiency between the optical probe package structure and the optical chip, improving the transmission efficiency and stability.

Figure 5:
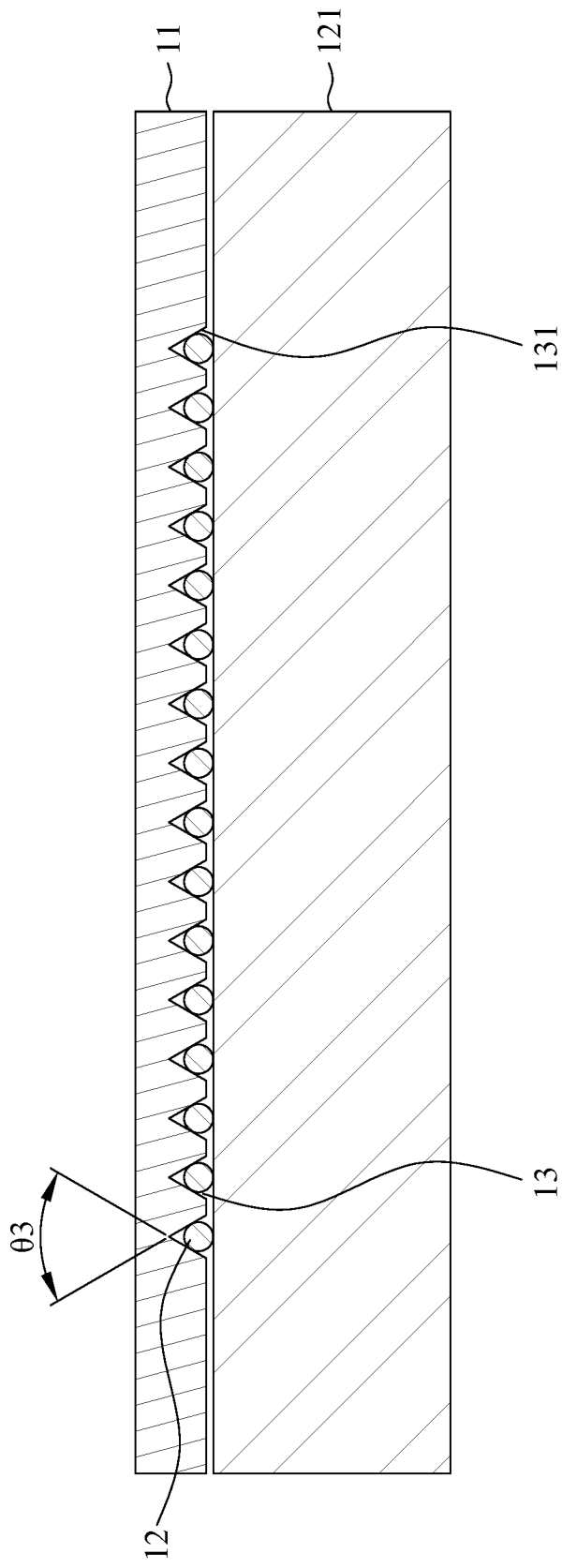
FIG. 5 is a cross-sectional view illustrating an optical fiber positioning area according to the first embodiment of the present invention.

Specifically, refer to FIG. 5, which is a cross-sectional view illustrating an optical fiber positioning area according to the first embodiment of the present invention. Specifically, as shown in FIGS. 1-5, the optical fiber positioning area 13 of the first embodiment of the present invention is disposed on the main body 11, and the optical fiber positioning area 13 includes a plurality of V-shaped grooves 131. Each V-shaped groove 131 accommodates one of the optical fibers 12, and the optical fibers 12 are positioned by the V-groove 131. More specifically, as shown in FIG. 5, an included angle θ3 of the V-shaped groove 131 may be about 70 degrees, the depth is between 0.4 mm and 1 mm, and the size corresponds to the optical fiber 12. Thereby, the optical probe package structure 100 of the first embodiment of the present invention, through the use of the V-shaped groove 131, is faster and more accurate when the package is fixed, the calibration and alignment time is reduced, and the packaging efficiency is improved.

Specifically, refer to FIGS. 1-4. According to the first embodiment of the present invention, the mode field conversion waveguide structure 14 is disposed on the main body 11 and coupled to the optical fiber 12. The mode field conversion waveguide structure 14 is used for converting the propagation field pattern of the optical signal L so that the mode field diameter of the optical signal L originally transmitted in the optical fiber 12 and the optical chip 21 match each other. In addition, the mode field conversion waveguide structure 14 in the present invention has an incident end 141, and the optical signal L transmitted by the optical fiber 12 enters the mode field conversion waveguide structure 14 from the incident end 141. It should be further explained that, referring to the following formulas (1) and (2), the formula (1) is used to calculate the mode field diameter of the optical signal L, wherein a is the radius of the core portion 123 of the optical fiber 12, V represents the V number of the optical fiber 12. Equation (2) is used to calculate the V number of the optical fiber 12, wherein NA represents the numerical aperture (NA) of the optical fiber 12, and λ represents the cut-off wavelength of the optical fiber 12. As seen from equations (1) and (2), the mode field diameter is calculated from the numerical aperture and the cutoff wavelength of the optical fiber, and is related to the diameter of the core portion 123 of the optical fiber 12. Since the calculation of the mode field diameter is familiar to those skilled in the art, it will not be repeated here. More specifically, in the present embodiment, the wavelength of the optical signal L is between 1.2 um and 1.6 um, the mode field diameter of the optical signal L before conversion is between 3 um and 10 um, and the mode field diameter is between 0.2 um and 0.9 um after conversion, however the present invention is not limited thereto. As such, the present invention matches the mode field diameter of the optical signal L originally transmitted in the optical fiber 12 with the optical chip 21 through the mode field conversion waveguide structure 14, thereby reducing the coupling loss and reducing the transmission loss of the optical signal L between the mode field conversion waveguide structure 14 and optical wafer 21.

$$MFD = 2a\left(0.65 + \frac{1.619}{V^{3/2}} + \frac{2.879}{V^6}\right) \quad (1)$$

$$V = \frac{2\pi}{\lambda}aNA \quad (2)$$

Specifically, referring to FIGS. 1-4, the optical waveguide 15 of the first embodiment of the present invention is disposed on the main body 11 and coupled to the mode field conversion waveguide structure 14, and the optical waveguide 15 is used for receiving the optical signal L converted by the field conversion waveguide structure 14 and transmitting the optical signal L matching the mode field diameter of the optical chip 21. Specifically, in the present embodiment, the structure of the optical waveguide 15 may include a waveguide, a ridge waveguide, etc., and the optical waveguide 15 is mainly used to help in transmitting optical signals. In addition, in some embodiments, the optical waveguide 15 may have a plurality of channels, and the optical signal L is mode-field converted and transmitted to different optical waveguides 15 through the mode-field conversion waveguide structure 14, so that the optical probe package structure 100 of the present invention can transmit the light signals L of different propagation fields simultaneously to the optical chip 21. Thereby, the applicability of the present invention is greatly improved, and since the number of channels of the optical waveguide 15 is not limited, it is suitable for mass production.

It should be further noted that the optical waveguide 15 has an emitting end 151, and the emitting end 151 is provided with a facet 1511, and the facet 1511 has a facet angle θ1, wherein the facet angle θ1 is mainly used to cause total reflection of the optical signal L transmitted to the facet 1511, and the optical signal L after the total reflection is transmitted along a second direction y and propagated from the emission end 151 of the optical waveguide 15. In some embodiments, the first direction x and the second direction y are mutually orthogonal. More specifically, in some embodiments, the optical waveguide 15 must be cut with a precise bevel angle, the facet 1511 can be formed by polishing the end of the optical waveguide 15, and the facet angle θ1 is about 45 degrees; however, the present invention is not limited thereto.

Furthermore, if the change in the transmission direction of the optical signal L caused by the facet angle θ1 of the facet 1511 is sufficient for the application, for example, if the change in the transmission direction of the optical signal L is sufficient between the optical probe package structure 100 and the optical chip 21 to achieve acceptable coupling loss, the facet angle θ1 can be between 37 degrees and 45 degrees. In other embodiments, the facets 1511 may be covered with a dielectric mirror stack, which may be configured to provide reflection for the wavelength of the optical signal L. It is worth mentioning again that the facet 1511 can also be used without any coating if the reflectivity on the facet 1511 is sufficient to deflect the light signal L into the desired direction. It is also worth mentioning that the facet 1511 can also be a curved shape instead of a straight shape. In other embodiments, the facet 1511 can be configured in a curved shape, and the curved facet 1511 can further provide functions such as focusing or collimation. The user can choose which method is more appropriate according to the application's needs, and the present invention should not be interpreted as limited thereto.

It is worth noting that, in the present embodiment, when the optical probe package structure 100 tests the plurality of optical chips 21 on the wafer 200, the optical probe package structure 100 is close to the dicing lane 211 of the optical chip 21. The optical signal L is vertically coupled out through the optical fiber 12 and totally reflected by the facet 1511 at the bottom of the optical waveguide 15, so that the optical signal L is converted from vertical transmission into the optical chip 21. More specifically, in the present embodiment, since the thickness of the optical probe package structure is between 0.4 mm and 0.8 mm, and the facet angle θ1 is between 37 degrees and 45 degrees, the optical probe package structure 100 of the present invention can enter the dicing lane 211 of the optical wafer 21 for testing, so as to analyze the device process yield at the earliest time and improve the process. Moreover, in terms of the accuracy of the alignment angle, the coupling accuracy of the optical probe package structure 100 and the wafer 200 at right angles can be more accurate than other angles, which greatly improves the stability and reliability of the present invention. However, the present invention is not limited thereto.

Hereinafter, other examples of the optical probe package structure 100 of the present invention will be described with reference to the drawings, so that those skilled in the art to which the present invention pertains may more clearly understand possible changes. Elements designated with the same reference numerals as above are substantially the same as those described above with reference to FIGS. 1-5. The same elements, features, and advantages as the optical probe package 100 will not be repeated.

Figure 6:
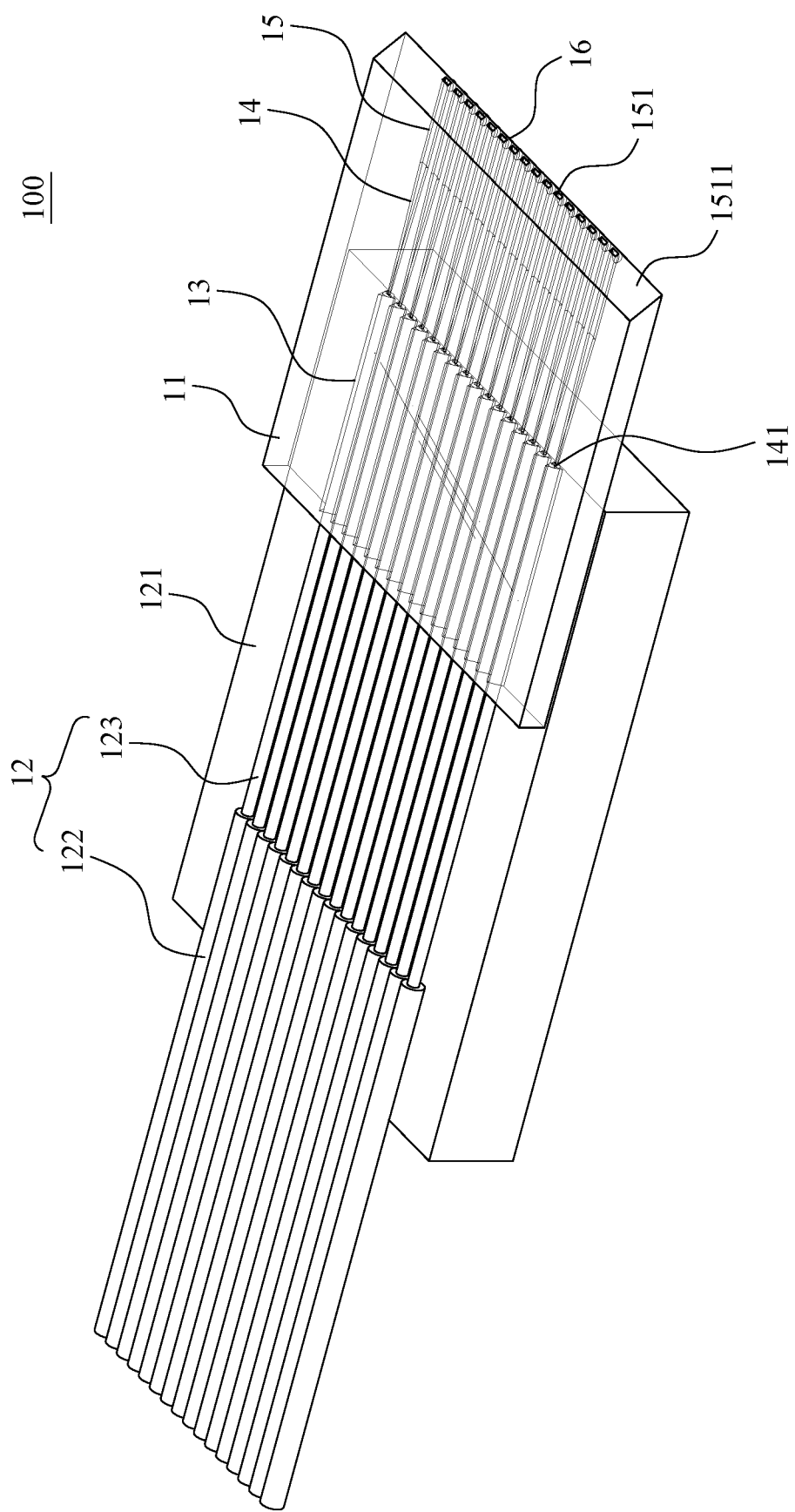
FIG. 6 is a schematic view illustrating that the optical signal according to the first embodiment of the present invention changes the propagation field type through the mode field conversion waveguide structure.
Figure 7:
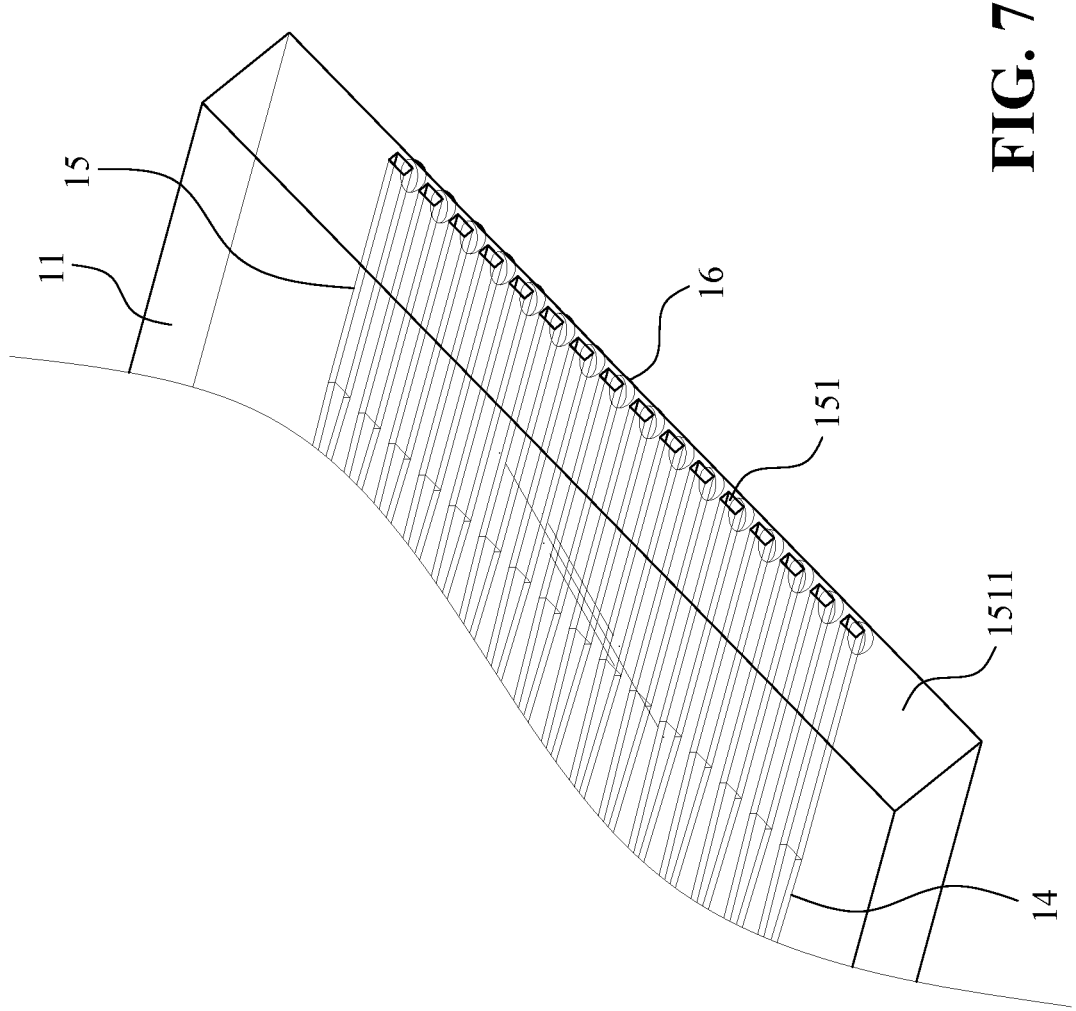
FIG. 7 is an enlarged view of an optical probe package structure according to a second embodiment of the present invention.

Refer to FIGS. 6-7. FIG. 6 is a schematic view of the optical probe package structure according to the second embodiment of the present invention; FIG. 7 is an enlarged view of the optical probe package structure according to the second embodiment of the present invention. As shown in FIG. 6, the optical probe package structure 100 of the photonic integrated circuit according to the present invention includes: a main body 11, an optical fiber 12, an optical fiber positioning area 13, a mode field conversion waveguide structure 14, an optical waveguide 15, and a microlens 16.

Specifically, referring to FIGS. 6-7, the optical probe package structure 100 according to the second embodiment of the present invention further includes a plurality of microlenses 16, and the microlenses 16 focus the optical signal L from the total reflection by the facet 1511 into the optical chips 21. In the present embodiment, the microlenses 16 may be formed by hardening an optically transparent material, and the optically transparent material may be an index matching oil that is field-matched with the optical signal transmitted by the optical chip 21. The microlens 16 may be disposed between the optical probe package structure 100 and the optical chip 21 to further reduce the transmission loss of the optical signal L between the optical probe package structure 100 and the optical chip 212. Specifically, the microlenses 16 are mainly used to reduce the coupling loss between the optical probe package structure 100 and the optical chip 21. Because the refractive indexes of air, glass and the material of the optical chip 21 are very different, it is easy to generate strong reflection when the optical signal L is transmitted to different interfaces. Therefore, by using silicon, glass or liquid (i.e., refractive index matching oil) with a refractive index closer to the two, an optical microlens is made and placed in front of the main body. The optical probe package structure 100 and the optical wafer 21 are aligned, and then the optically transparent material is cured with ultraviolet light at a specific temperature. More specifically, the microlens 16 can focus or collimate the optical signal L into the optical wafer 21, thereby reducing the coupling loss, but the present invention is not limited thereto.

Figure 8:
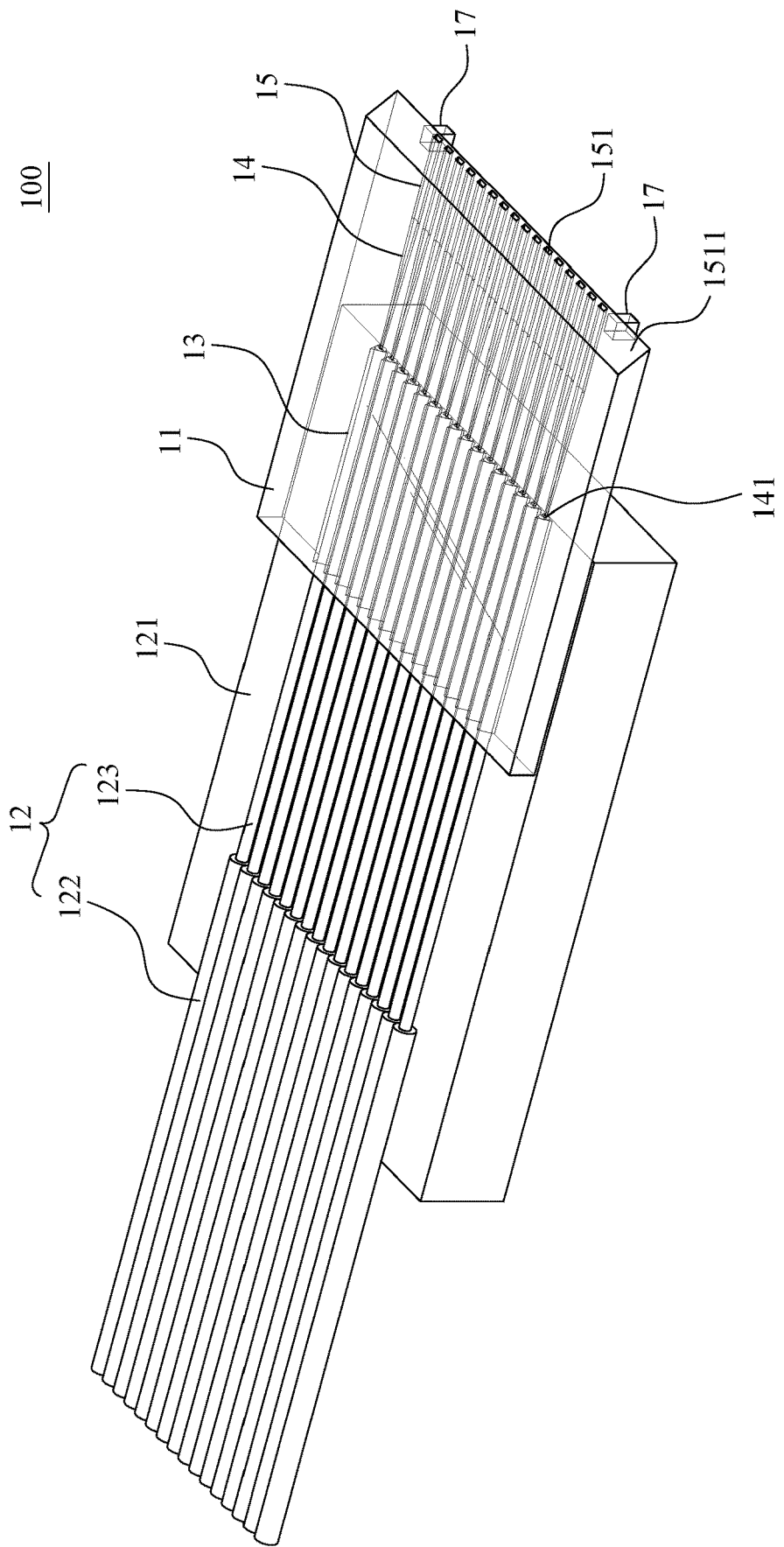
FIG. 8 is a schematic view of a package structure of an optical probe according to the second embodiment of the present invention.

Refer to FIG. 8, which is a schematic view of an optical probe package structure according to the third embodiment of the present invention. As shown in FIG. 8, the optical probe package structure 100 of the photonic integrated circuit according to the present invention includes: a main body 11, an optical fiber 12, an optical fiber positioning area 13, a mode field conversion waveguide structure 14, an optical waveguide 15, and a positioning block 17.

Specifically, as shown in FIG. 8, the optical probe package structure 100 according to the third embodiment of the present invention further includes a positioning block 17, the positioning block 17 is disposed on the front end of the main body, and the shape of the positioning block 17 corresponds to the dicing lane 211. In the present embodiment, the positioning block 17 is mainly used for the calibration and alignment of the placement position before the testing. As such, the optical probe package structure 100 of the third embodiment of the present invention can ensure the angle and position of the optical probe package structure 100 when testing the optical chip 21 on the wafer 200 through the setting of the positioning block 17, and further ensure vertical coupling. Therefore, the coupling efficiency between the optical probe package structure 100 and the optical wafer 21 is improved, the alignment accuracy and detection efficiency are improved, and the tolerance and calibration time are reduced.

It can be understood that those with ordinary knowledge in the technical field to which the present invention pertains can make various changes and adjustments based on the above examples, which will not be listed one by one here.

Thereby, the present invention has the following implementation effect and technical effect:

First, according to the optical probe package structure 100 of the present invention, the thickness of the optical probe package structure is between 0.4 mm and 0.8 mm, and a facet 1511 is disposed at the emission end 151, and the facet 1511 has a facet angle θ1 to cause total reflection of the optical signal L, and the optical signal L after the total reflection propagates along the second direction y and propagates out from the emission end 151 of the mode field conversion waveguide structure 14. Thereby, the optical probe package structure 100 can penetrate into the optical wafer for testing before wafer cutting and polishing, that is, before testing, so as to analyze the component process yield at the earliest time, improve the process, and reduce additional manufacturing costs and the product development cycle, while improving the detection accuracy and convenience of the end-coupling light, with both wide applicability and high accuracy.

Second, according to the optical probe package structure 100 of the present invention, the material of the main body 11 may include silicon material, since the silicon material does not absorb the transmission wavelengths 1310 nm and 1550 nm of optical signals for optical communication, the light signal of the above-mentioned wavelength band can pass through unhindered, so as to achieve the purpose of reducing light loss. In addition, the material of the main body 11 of the optical probe package structure 100 may be the same as the material of the optical chip 21, thereby improving the coupling efficiency between the optical probe package structure and the optical chip, improving transmission efficiency and stability.

Third, the optical probe package structure 100 of the present invention has an optical fiber positioning area 13, and the optical fiber positioning areas 13 include a plurality of V-shaped grooves 131 to position the optical fibers 12 through the V-shaped grooves 131. Each V-groove 131 accommodates only a single optical fiber 12 at most, and ensures the angle and position of the optical fiber 12, the mode field conversion waveguide structure 14 and the optical waveguide 15 when testing the optical chip 21 on the wafer 200 through the optical probe package structure 100. Therefore, the optical probe package structure 100 of the present invention is faster and more accurate when the package is fixed, the calibration and alignment time is reduced, and the packaging efficiency is improved.

Fourth, the optical probe package structure 100 of the present invention has an optical waveguide 15, and the optical waveguide 15 can have a plurality of channels, and the optical signal L is subjected to mode field conversion through different mode field conversion waveguide structures 14 to be transmitted to different optical waveguides 15, which enables the optical probe package structure 100 of the present invention to simultaneously transmit optical signals L of different propagation fields to the optical chip 21. Thereby, the applicability of the present invention is greatly improved, and since the number of channels of the optical waveguide 15 is not limited, it is suitable for mass production.

Fifth, according to the optical probe package structure 100 of the second embodiment of the present invention, the focusing or collimation of the optical signal L is achieved by disposing the microlenses 16 between the optical probe package structure 100 and the optical chip 21. Thereby, the present invention achieves reducing the coupling loss, and further reducing the coupling loss of the optical signal L between the optical probe package structure 100 and the optical chip 21.

Sixth, the optical probe package structure 100 according to the first embodiment of the present invention ensures the angle and position of the optical probe package structure 100 when testing the optical chip 21 on the wafer 200 through the disposition of the positioning block 17, and further guarantees the precision of vertical coupling to improve the coupling efficiency between the optical probe package structure 100 and the optical wafer 21, as well as improve the alignment precision and reduce the tolerance.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An optical probe package structure, applicable to a test environment for testing a plurality of optical chips on a wafer, comprising:
    a main body;
    a plurality of optical fibers, coupled to the main body, the optical fibers being arranged on a substrate, and each of the optical fibers being used to transmit an optical signal along a first direction;
    an optical fiber positioning area, disposed on the main body, and the optical fiber positioning area having a plurality of V-grooves, each of the V-grooves accommodating one of the optical fibers, and the optical fibers being positioned by the V-grooves;
    a mode field conversion waveguide structure, disposed on the main body and coupled to the optical fibers, the mode field conversion waveguide structure being used for receiving the optical signal in each of the optical fibers and converting a mode field diameter of the optical signal, and the mode field conversion waveguide structure having an incident end, from which the optical signal transmitted by each of the optical fibers entering the mode field conversion waveguide structure; and
    an optical waveguide, disposed on the main body and coupled to the mode field conversion waveguide structure, the optical waveguide having an emitting end, and the emitting end being provided with a facet, and the facet having a facet angle;
    wherein, the facet angle causes the optical signal after mode field conversion by the mode field conversion waveguide structure to be totally reflected by the facet to generate a reflected optical signal transmitted from the emitting end of the optical waveguide along a second direction, and the reflected optical signal enters one of the optical chips.

2. The optical probe package structure according to claim 1, wherein the facet angle is between 37 degrees and 45 degrees.

3. The optical probe package structure according to claim 1, wherein the mode field diameter before the mode field conversion is between 3 um and 10 um, and the mode field diameter after the mode field conversion is between 0.2 um and 0.9 um.

4. The optical probe package structure according to claim 1, wherein the material of the optical probe package structure includes silicon material.

5. The optical probe package structure according to claim 1, wherein each of the optical fibers includes a film layer and a core portion, the film layer covers the core portion, and the optical signal is transmitted in the core portion.

6. The optical probe package structure according to claim 5, wherein the material of the optical probe package structure is the same as the material of the optical chips.

7. The optical probe package structure according to claim 1, further comprising a plurality of microlenses, disposed on the emitting end of the mode field conversion waveguide structure, and the reflected optical signal from the facet is focused into one of the optical chips through one of the microlenses.

8. The optical probe package structure according to claim 1, wherein the wafer has a dicing lane, and the dicing lane is used for inserting the optical probe package structure, so that the optical probe package structure is coupled to the optical chips on the wafer.

9. The optical probe package structure according to claim 8, further comprising a positioning block, disposed at a front end of the main body, and having a shape corresponding to the dicing lane.

* * * * *